United States Patent

Stevens

[15] 3,681,578

[45] Aug. 1, 1972

[54] FAULT LOCATION AND RECONFIGURATION IN REDUNDANT DATA PROCESSORS

[72] Inventor: Arthur Dexter Stevens, Manningtree, England

[73] Assignee: The Marconi Company Limited, London, England

[22] Filed: Nov. 13, 1970

[21] Appl. No.: 89,203

[30] Foreign Application Priority Data

Nov. 21, 1969 Great Britain.............57,015/69

[52] U.S. Cl...................................................235/153

[51] Int. Cl............................G06f 15/16, G06f 11/00

[58] Field of Search.........235/153; 340/146.1, 172.5

[56] References Cited

UNITED STATES PATENTS

| | | | |
|---|---|---|---|
| 3,348,197 | 10/1967 | Akers, Jr. et al. | 235/153 X |
| 3,069,562 | 12/1962 | Steele | 340/146.1 X |
| 3,226,569 | 12/1965 | James | 340/146.1 X |
| 3,252,149 | 4/1966 | Weida et al. | 340/146.1 X |
| 3,517,174 | 6/1970 | Ossfeldt | 235/153 |

*Primary Examiner*—Charles E. Atkinson
*Attorney*—Baldwin, Wight & Brown

[57] ABSTRACT

A data processing arrangement having three data processors, each with its own data store and each processing the same information is connected to a majority voting circuit. The majority voting circuit gives as an output that output of the majority of the processors. Whenever a processor output disagrees with the majority verdict above a predetermined disagreement rate an alarm is raised or the particular processor isolated. Also provided is a switch for rendering inoperative the alarm or isolating means until the rate of disagreement falls below a further predetermined level.

4 Claims, 2 Drawing Figures

Figure 1:
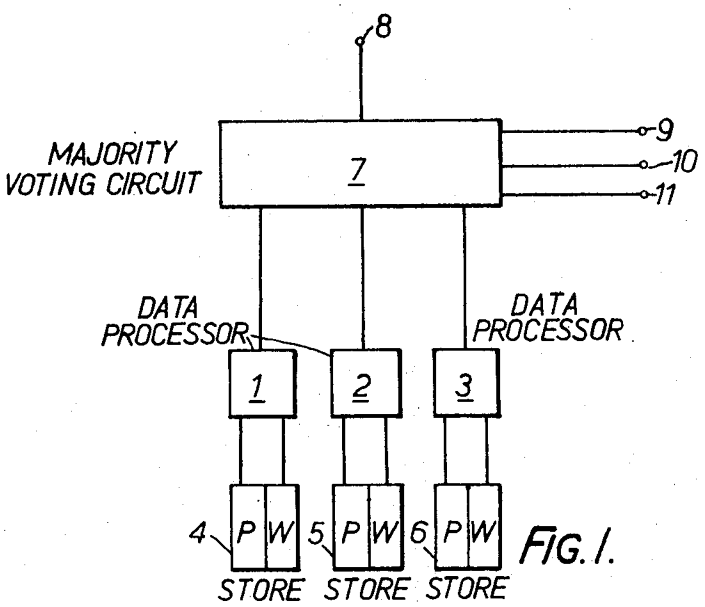

INVENTOR
Arthur Dexter Stevens
BY
Baldwin Wight & Brown
ATTORNEYS

FAULT LOCATION AND RECONFIGURATION IN REDUNDANT DATA PROCESSORS

The present invention relates to data processing arrangements and more particularly to data processing arrangements in which, to guard against errors, three data processors are utilized to process the same information and the outputs are passed to a majority voting circuit which provides as its output the signals that correspond to those appearing on the majority of the processor outputs. This arrangement will give an output free from errors provided that no more than one processor is in error at a time. The degree of accuracy of processing is, therefore, substantially increased over arrangements using solely a single processor.

In such a system, when a fault is detected in the output of one data processor no action is immediately taken apart from the ignoring of this output. If, however, the same processor is repeatedly in error then this is detected and the processor is isolated from the circuit so that it may be examined and if necessary repaired. Each processor has associated therewith its own working data store. After examination the store of the processor which has been in isolation will contain old information which is no longer required and will also lack up to date information which it needs. This problem may be overcome by arranging for the complete cancellation of the information in the store followed by the copying of the data information stores in one of the stores of the remaining two operative processors. This, however, requires expensive circuitry and also requires delay in the processing operation whilst the data is transferred from one store to the other.

It is the object of the invention to provide for the reconnection of a processor without excessive disturbance of the processing operation.

According to this invention a data processing arrangement includes three data processors each with an associated working data store and each arranged to process the same information; a majority voting circuit to which the output of each processor is fed and which produces, as its output, the same output as that occurring on the majority of the processor outputs; means for detecting when a processor output disagrees with the majority verdict at a disagreement rate above a first predetermined level and for providing, in the event of such a detection, an alarm and/or isolation of the processor; and further means for detecting when a processor output disagrees with the majority and for rendering said alarm/isolating means inoperative for a processor following the reconnection into circuit of the processor after it has been disconnected or isolated, until the rate of disagreement detected by said further detecting means falls to a second predetermined level.

Preferably fault signals indicating that a processor disagrees with the majority are fed to said detecting means via switching means having two outputs, one connected to said detecting means and the other to said further detecting means said switching means being switched to said other output after reconnection of a processor and the output of said further means being arranged to effect the changeover of the switching means to said one output when the disagreement rate falls to said second predetermined level.

Figure 2:
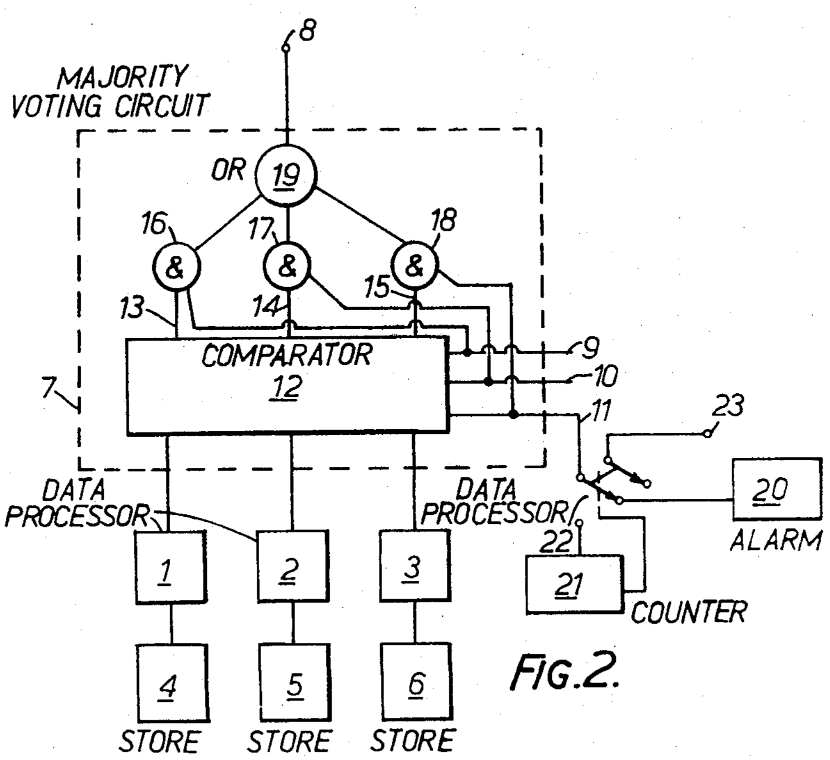

The invention is illustrated in and further explained in connection with the accompanying drawings in which:

FIG. 1 which is provided for purposes of explaination, is a partial block circuit diagram of a data processing arrangement employing majority voting and FIG. 2 shows a portion of the circuit of FIG. 1 modified to provide a data processing arrangement in accordance with the invention.

In FIG. 1 there are shown three data processors, referenced 1, 2 and 3 and each having an associated program and working store 4, 5 and 6 respectively. The program and working stores, although independent, are shown in one block but to indicate their separation the block is divided into two parts; the program section being referenced P and the working section referenced W.

The outputs of the three processors are fed to a majority voting circuit 7 (not shown in detail) and the output of the majority voting circuit appears, for utilization by other apparatus, at an output terminal 8. In addition the majority voting circuit has fault indication outputs 9, 10 and 11, the appearance of an output signal of one kind on one of which is indicative of an error in the processing of the respective one of the data processors 1, 2 and 3.

The manner of operation of this arrangement is well known and straight forward. Each of the processors processes the same information, which is supplied to the working stores of all three processors via inputs, not shown, in accordance with the programs stored in the program section of the stores 4, 5 and 6 (each processor having the same programs stores in its program section). The outputs from the processors should therefore be identical but in the event of only one processor operating incorrectly there will still be two identical outputs and the majority voting circuit selects the output corresponding to these two outputs for transmission to the output terminal 8. It also indicates on one of the lines 9–11 which processor is in error.

FIG. 2 partially shows the modifications required to the circuit of FIG. 1 to produce a data processing arrangement in accordance with the invention. Only the parts associated with processor 3 are shown, it being understood that similar parts are provided for each processor. The majority voting circuit 7, which is shown in dotted lines in the drawing, is shown in sightly more detail, although still diagrammatically, with its inputs and outputs carrying reference numerals corresponding to those used in FIG. 1.

The majority voting circuit 7 as shown comprises a comparison circuit 12 which has six outputs, the fault indication outputs 9, 10 and 11 and three further outputs 13, 14 and 15, at which appear outputs identical with the outputs from processors 1, 2 and 3 respectively. Each of the outputs 13, 14 and 15 is connected as one input to a respective one of three two-input AND gates 16, 17 and 18, the other inputs of which are connected to the outputs 9, 10 and 11 respectively. The AND gates 16, 17 and 18 have their outputs connected to an OR gate 19, the output of which comprises output 8 of the majority voting circuit.

In addition to being connected to the input of one of the AND gates 16 to 18 each of the outputs 9, 10 and 11 is connected to a first fault detection means in the form of an alarm and/or isolating circuit 20 and to a second fault detection means in the form of a fault rate counter 21 via a switch 22. Only the fault detection means and switch for the output 11 are shown in the drawing although each of the outputs 9 and 10 has identical equipment. The switch 22 is a two-pole ganged switch one pole of which allows output 11 to be connected to either circuit 20 or circuit 21 and the other pole of which connects the input of circuit 20 to an input 23 when said one pole of the switch connects output 11 to the circuit of 21 or, in the other position of the switch, leaves the input 23 unconnected to circuit 20.

The processors 1, 2 and 3 of FIG. 2 operate, in the same manner as those of FIG. 1, on the information stores in the programs 4, 5 and 6 and feed their outputs to the majority voting circuit 7. The comparison circuit 12 included in the majority voting circuit compares the three inputs fed to it and if they all agree a "1" appears on each of the outputs 9, 10 and 11 and these "1" outputs are applied to the respective inputs of the AND gates 16, 17 and 18. The comparison circuit also feeds the outputs from the processors 1, 2 and 3 via the outputs 13, 14 and 15 to the AND gates 16, 17 and 18 and, since all the gates will be enabled by the signals from the outputs 9, 10 and 11, the processor outputs pass to the OR gate 19 and thence to the output 8 for utilization. If, however, one of the outputs from the processors 1, 2 and 3 differs from the other two then the comparison circuit feeds a "0" to the respective one of the outputs 9, 10 and 11 and a "1" to the other two outputs. Thus the AND gate to which the output from the processor which disagrees with the majority is fed will be inhibited by the "0" signal on its other input and this processor output will be prevented from reaching the OR gate 19. Also the "0" will be fed via the switch 22 to the alarm and/or isolating circuit 20 (the switch 22 being shown in the drawing in the position it normally occupies during operation of the processing arrangement).

This process carries on unhindered until the alarm and/or isolating circuit 20 detects that a processor is producing erroneous outputs at a rate above a first predetermined level. When this occurs the circuit 20 will produce an alarm signal as an indication of the occurrence and if so designed may isolate the fault processor from the processing arrangement so that it can be checked. When the processor has been repaired and is brought back into service, the switch 22 is changed to its other position so as to connect input 23 to the alarm and/or isolating circuit 20 and to connect the fault output for the processor to the fault rate counter circuit 21. At input 23 a voltage is applied corresponding to a "1" so that first detection means 20 receives an input which appears to come from a correctly operating processor and the circuit therefore does not produce an alarm signal despite faulty operation of the processor. The circuit 21 receives all the fault indication outputs occurring on the fault indication output for the processor and is arranged to count the number of faults occurring over successive periods of time. As soon as the fault rate determined by the circuit 21 falls below a second predetermined level then the output from the circuit 21 causes the switch 22 to move to the normally operating position in which the fault outputs are fed to the circuit 20.

By this means the alarm and/or isolating circuit 20 is inhibited until the fault rate on the processor falls to a reasonable level below the first pre-determined level which would cause the circuit 20 to operate. By this means a processor can be brought back on line and its program store allowed to be brought up to date without the alarm and/or isolating means operating continually. In addition no processing time is wasted whilst the store of the faulty processor is updated by transferring information from one of the correct processor stores.

Obviously although the switch 22 is shown as a mechanical switch it will normally be in practice an electronic switch.

I claim:

1. A data processing arrangement including three data processors each with an associated working data store and each arranged to process the same information; a majority voting circuit to which the output of each processor is fed and which produces, as its output, the same output as that occurring on the majority of the processor outputs; detecting means fed with signals from said majority voting circuit, for detecting when a processor output disagrees with the majority verdict at a disagreement rate above a first predetermined level and for providing, in the event of such a detection, an alarm and/or isolation of the processor; and further detecting means, for detecting when a processor output disagrees with the majority verdict at a disagreement rate above a second predetermined level and for rendering said detecting means inoperative for a particular processor until the rate of disagreement detected by said further detecting means falls to said second predetermined level, said further detecting means being fed with said signals from said majority voting circuit following the re-connection into circuit of said particular processor after it has been disconnected or isolated.

2. An arrangement as claimed in claim 1 wherein said further detecting means includes switching means having two outputs, one connected to said detecting means and the other to said further detecting means said switching means being switched to said other output after reconnection of a processor and the output of said further detecting means being arranged to effect the changeover of the switching means to said one output when the disagreement rate falls to said second predetermined level.

3. In a data processing arrangement including three data processors having input connections for processing the same information and each having output means at which the processed information appears; majority voting circuit means receiving the outputs from said data processors for providing an output which is the same as that occurring on the majority of said data processor outputs, said majority voting circuit means having a disagreement signal output terminal for each of said data processors at which a disagreement signal appears whenever a corresponding data processor output disagrees with the outputs of the other two data processors; and a separate fault detection means connected with each of said disagreement signal output terminals for determining, in response to a disagreement signal rate above a first predetermined level, when an associated data processor is to be disconnected from the arrangement and for monitoring a reconnected data processor to determine when disagreement signals associated therewith fall below a second predetermined level.

4. In a data processing arrangement as defined in claim 3 wherein each said fault detection means comprises alarm means for indicating when a disagreement signal rate is above said first predetermined level, input means for rendering said alarm means inoperative, switch means, and means for actuating said switch means from a second to a first position thereof when disagreement signals fall below said second predetermined level, said switch means having one position connecting an associated disagreement signal output terminal to said alarm means and a second position connecting said input means to said alarm means and connecting said associated disagreement signal output terminal to said means for actuating.

* * * * *